United States Patent [19]

Prasad et al.

[11] Patent Number: 5,122,355

[45] Date of Patent: Jun. 16, 1992

[54] MEMBRANE NITROGEN PROCESS AND SYSTEM

[75] Inventors: Ravi Prasad, East Amherst; Oscar W. Haas, North Tonawanda; Frank Notaro, Amherst; David R. Thompson, Grand Island, all of N.Y.

[73] Assignee: Union Carbide Industrial Gases Technology Corporation, Danbury, Conn.

[21] Appl. No.: 533,848

[22] Filed: Jun. 6, 1990

[51] Int. Cl.[5] .......................... B01J 10/00; C01B 21/00
[52] U.S. Cl. .................................. 423/351; 422/189; 422/198
[58] Field of Search ................. 422/189, 198; 423/351

[56] References Cited

U.S. PATENT DOCUMENTS

| | | | |
|---|---|---|---|
| 2,582,885 | 1/1952 | Rosenblatt | 423/351 |
| 3,240,554 | 3/1966 | Angerhofer | 423/351 |
| 4,960,579 | 10/1990 | Campbell | 423/351 |

OTHER PUBLICATIONS

European Patent Application 0,335,418 published Oct. 4, 1989.
"Inert Gas Generation Systems for Offshore Platforms", Earl R. Beaver and Tommy E. Graham, Permea Incorporated; Thorbjorn Johannessen and Henrik Kvivik, Maritime Protection A/S (a unit of Permea Inc.) and American Institute of Chemical Engineers, 1986 Spring Meeting, Apr. 1986, New Orleans, La.

*Primary Examiner*—Wayne A. Langel
*Attorney, Agent, or Firm*—Alvin H. Fritschler

[57] ABSTRACT

Feed air is separated in a membrane system, with recovered nitrogen being purified in a deoxo unit and dried in an adsorbent dryer using high temperature purge gas. The heat generated in the deoxo unit can be used to satisfy the thermal energy requirements of dryer regeneration, without decrease in product recovery. Membrane permeate gas can be used for purge at high purge/feed ratio to reduce the energy requirements of bed regeneration.

24 Claims, 6 Drawing Sheets

MEMBRANE NITROGEN PROCESS AND SYSTEM

BACKGROUND OF THE INVENTION

1. Field of the Invention

The invention relates to permeable membrane processes and systems for air separation. More particularly, it relates to improved permeable membrane processes and systems for the production of dry nitrogen product gas from feed air.

2. Description of the Prior Art

Permeable membranes capable of selectively permeating oxygen from air are a convenient and desirable means for separating air and recovering nitrogen product gas. Such product gas, however, is generally accompanied by a significant amount of moisture. For some applications, a dry, nearly oxygen-free nitrogen product gas is required. In small to moderate size applications, such purity levels are presently most economically achieved by initially producing nitrogen at about 98% purity by means of membrane separation of air, and then scavenging the remaining oxygen in a post cleanup technique. The most readily available oxygen post cleanup approach involves the use of a deoxygenation system, referred to as a "deoxo system", for converting oxygen to water by combining the oxygen with hydrogen over a noble metal catalyst. The deoxo reaction generates a significant amount of heat, typically raising the exit gas temperature approximately 300° F. per 1% of oxygen removed. The resulting nitrogen product contains less than about 5 ppm oxygen, but substantial quantities of water, e.g. 30–40,000 ppm, and residual hydrogen. In many applications, it is desirable to remove such moisture content, either to prevent condensation and corrosion in plant piping and instrumentation, or because its presence is incompatible with the intended end use of the nitrogen product gas. An aftercooler, moisture separator and adsorptive dryer are generally utilized for this purpose. If an adiabatic pressure swing adsorption (PSA) system and process are used for such drying purposes, a significant fraction of the dry nitrogen product gas may be used as purge gas for the PSA operation. Typically, such a PSA dryer might require a dry purge flow equal to at least 15% of the total product flow in order to achieve a desirable pressure dew point (PDP) of $-40°$ F. In conventional post cleanup applications, a high temperature regeneration cycle, in which the portion of nitrogen product gas used for purge purposes is heated prior to passage to the dryer, is preferred because of the lower purge gas flow requirements of such high temperature operation, typically less than half that required for the adiabatic PSA cycle. This purge flow differential may become even larger if a very dry ($-100°$ F. PDP) product gas is desired. A less common alternative involves the use of a heated, ambient air purge followed by a dry product gas cooling purge to further improve cycle recovery, but at the expense of additional thermal energy expenditure.

Using dry product gas as purge, adsorbent energy requirements may be on the order of $8 \times 10^{-5}$ KW per SCFH of product nitrogen. By comparison, the use of wet purge gas increases such energy requirements to approximately $2.5 \times 10^{-4}$ KW per SCFH. Thus, a trade-off will be seen to exist between dryer recovery and thermal energy requirements.

Because of the inherent simplicity of permeable membrane systems, there is a strong incentive and desire in the art to employ membrane systems for all types of air separation operations, including those in which dry, high purity nitrogen product gas is required. For such dry nitrogen applications, it is desired to obtain the benefits achieved in the higher temperature dryer regeneration referred to above, while minimizing the energy requirements associated therewith.

It is an object of the invention, therefore, to provide an improved process and system for the production of dry, high purity nitrogen.

It is another object of the invention to provide a process and system for dry, high purity nitrogen production employing high temperature dryer regeneration without the high thermal energy costs associated therewith.

It is a further objective to provide a dry, high purity nitrogen process and system utilizing high temperature dryer regeneration and minimizing thermal energy, product nitrogen recovery and capital cost requirements.

With these and other objects in mind, the invention is hereinafter described in detail, the novel features thereof being particularly pointed out in the appended claims.

SUMMARY OF THE INVENTION

In the production of dry, high purity nitrogen following air separation in a membrane system, the thermal energy generated in a catalytic deoxygenation system is used as a source of heat for the purge gas used in a high temperature membrane dryer system. By the choice of adsorption cycle, purge gas source and wet waste purge gas recycle, high temperature dryer regeneration can be achieved at low thermal energy requirements, with minimum impact on product nitrogen recovery and capital costs for the overall system.

BRIEF DESCRIPTION OF THE DRAWINGS

The invention is hereinafter described in detail with reference to the accompanying drawings in which.

DETAILED DESCRIPTION OF THE INVENTION

The objects of the invention are accomplished by the use of high temperature regeneration of the product nitrogen dryer in processing embodiments adapted to minimize the thermal energy requirements, enhance product nitrogen recovery and achieve overall efficiency in the production of dry, high purity nitrogen utilizing desirable membrane systems for initial air separation purposes.

Figure 1:
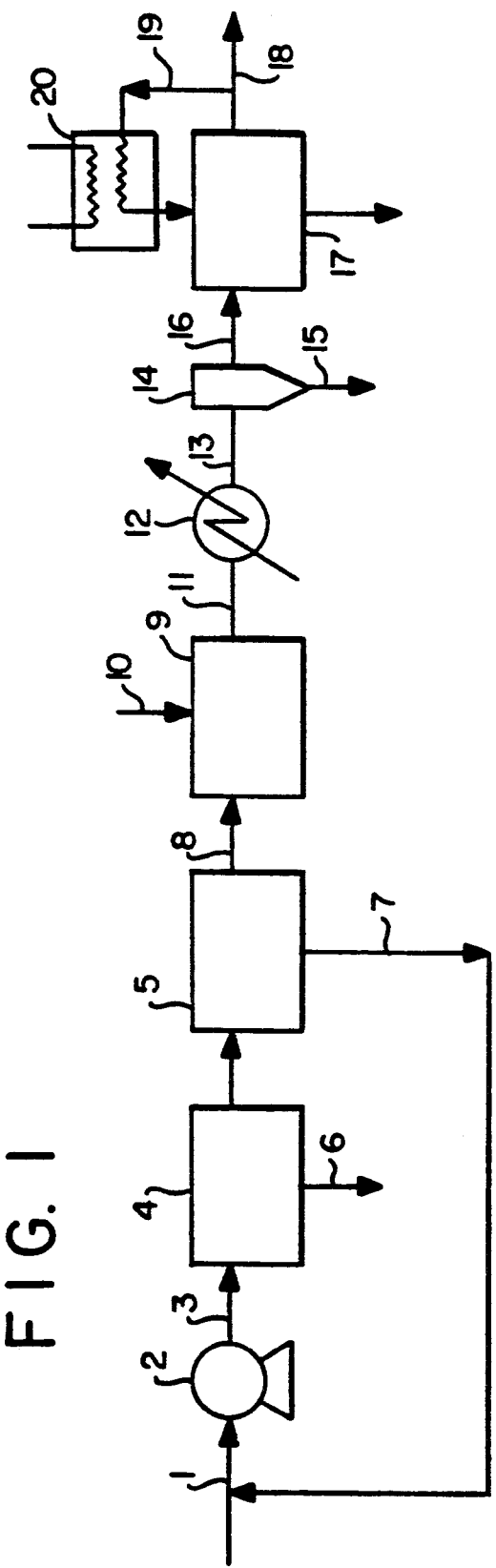
FIG. 1 is a schematic diagram of an embodiment of conventional practice for the production of dry, high purity nitrogen employing a membrane system for initial air separation.

In the practice of the invention, feed air is passed to a membrane system for air separation and the recovery of low to moderately pure, e.g. typically around 98%, nitrogen permeated gas. The oxygen contained in this nitrogen gas stream is then scavenged by use of a conventional deoxo system, which removes said oxygen by the reduction thereof with hydrogen to produce water over a noble metal catalyst. The energy released by this exothermic reaction heats the nitrogen to 400°-600° F. and results in a nitrogen gas stream containing 30,000 to 40,000 ppm $H_2O$ and some excess hydrogen. In conventional operations, such heat and water are removed by separate cooling and adsorptive drying units following said deoxygenation. In FIG. 1 illustrating such conventional practice, feed air is passed in line 1 to compressor 2 and therefrom in line 3 at the desired membrane permeation pressure to the air separation membrane system comprising membrane 4, the first stage air separation membrane unit, and membrane 5, the second stage air separation membrane unit. In said membrane units, oxygen is more readily permeated, and a nitrogen-enriched stream is recovered as non-permeate gas. The oxygen permeate gas from membrane 4 is withdrawn from the system through line 6, while such permeate gas from membrane 5 is typically recycled through line 7 for recompression together with additional quantities of feed air in line 1.

Non-permeate gas from membrane 5 is passed in line 8 to deoxo unit 9, into which hydrogen is passed through line 10 for reaction with the approximately 2% residual oxygen in the nitrogen stream. The nitrogen stream entering deoxo unit 9 is typically at about 90° F., and is heated by the exothermic heat of reaction therein, to about 600° F. The treated and thus-heated nitrogen stream, having its oxygen content reduced to about 5 ppm, leaves deoxo unit 9 through line 11 and is passed to cooler 12, where the temperature of the gas stream is reduced to about 75° F. The nitrogen gas then passes in line 13 to conventional moisture separator 14, from which separated moisture is removed through discharge line 15. The nitrogen gas stream then passes through line 16 to PSA dryer unit 17 for final drying. Residual moisture is removed from the desired nitrogen product gas in said dryer, with dry, high purity nitrogen being recovered through line 18. A portion of the product gas stream is diverted for purge purposes, however, by passage in line 19 to heater unit 20, from which high temperature nitrogen is passed to dryer 17 for use as purge gas. Waste purge gas containing entrained moisture is removed from the system through line 21.

As noted above, it is desirable to employ high temperature dryer regeneration, but to simultaneously reduce the associated thermal energy costs, desirably without appreciable adverse effect on product recovery. In the practice of the embodiments of the invention, such a result may be accomplished by the effective use of the heat generated in the deoxygenation reaction to thermally regenerate the adsorptive dryer, with a portion of the relatively dry permeate gas from the membrane air separation system being desirably employed as purge gas.

Figure 2:
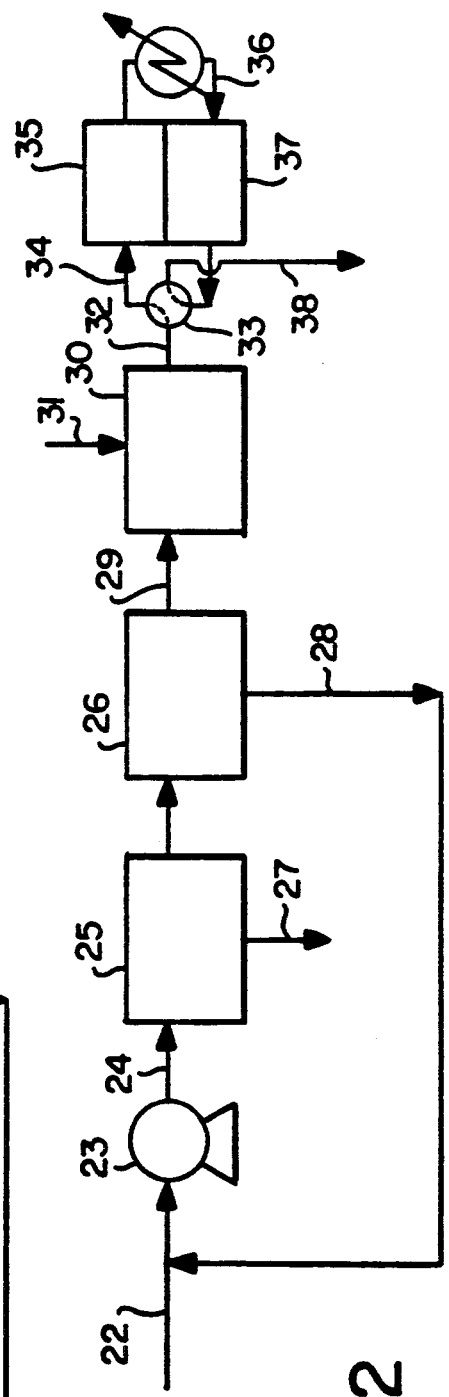
FIG. 2 is a schematic diagram of a preferred embodiment of the invention for the production of dry, high purity nitrogen employing a membrane system for initial air separation and high temperature product dryer regeneration.

In the desirable embodiment of the invention illustrated in FIG. 2 of the drawings, feed air is passed in line 22 to air compressor 23, with compressed air therefrom passing in line 24 to the membrane air separation system, comprising first stage membrane unit 25 and second stage membrane unit 26. Permeate gas, which is oxygen enriched, is removed from membrane 25 through discharge line, while the permeate from membrane 26, containing a more significant amount of nitrogen, is recycled in line 28 for passage to compressor 23 together with additional quantities of feed air in line 22. A non-permeate nitrogen stream is passed through line 29 from the membrane system to deoxo unit 30, to which hydrogen is passed through line 31 for reaction with oxygen present in said nitrogen stream. The thus treated and heated nitrogen stream is passed from deoxo unit 30 in line 32 to suitable valve means 33, e.g. a four-port valve, adapted to pass said nitrogen stream as a heated purge gas to one dryer bed for regeneration thereof prior to passage to a second dryer for removal of residual water. Thus, the nitrogen stream is directed by said valve means through line 34 to dryer bed 35 undergoing regeneration as a high temperature purge gas therefor. Upon discharge from said dryer bed 35, the purge gas is passed to integrated cooler and moisture separator means 36 prior to entry into dryer bed 37 being used for adsorption of residual moisture from the nitrogen stream, which is removed therefrom through said valve means 35, with dry, high purity nitrogen product gas being recovered in line 38.

The processing cycle of the FIG. 2 embodiment operates at essentially constant pressure so that pressure blowdown losses are avoided as in the FIG. 1 conventional operation. In addition, no recycle of dry nitrogen product purge is required and, significantly, no additional thermal energy must be supplied for dryer regeneration purposes.

In other embodiments of the invention, the purge stream for dryer regeneration may be a portion of the second stage membrane permeate gas, rather than the nitrogen stream processed in the deoxo unit downstream of the membrane system as in the FIG. 2 embodiment. This alternative processing approach is made possible since the second stage permeate gas is quite dry and is a fairly large sized stream, e.g. typically about 50-80% of the nitrogen product stream. As a result, a large quantity of such permeate gas is readily available for purge purposes. The flow rate of second stage permeate used for purge will commonly be up to about 70% of the nitrogen product flow rate. As a result, a large purge to feed ratio can be employed in the dryer system, as compared to that employed in the conventional FIG. 1 embodiment in which a portion of the product nitrogen is used as purge. Since a greater amount of purge gas is available for dryer regeneration than in the conventional approach, it is not necessary to heat the purge gas to as high a temperature for effective dryer regeneration as in the conventional approach. Thus, a desired saving in the thermal energy requirements of bed regeneration are realized. As a portion of the nitrogen product gas need not be used for dryer purge, an overall increase in nitrogen product recovery is realized in the practice of such embodiments of the invention, although the second stage membrane permeate is used for purge purposes rather than being directly recycled for passage through the membrane system.

Figure 3:
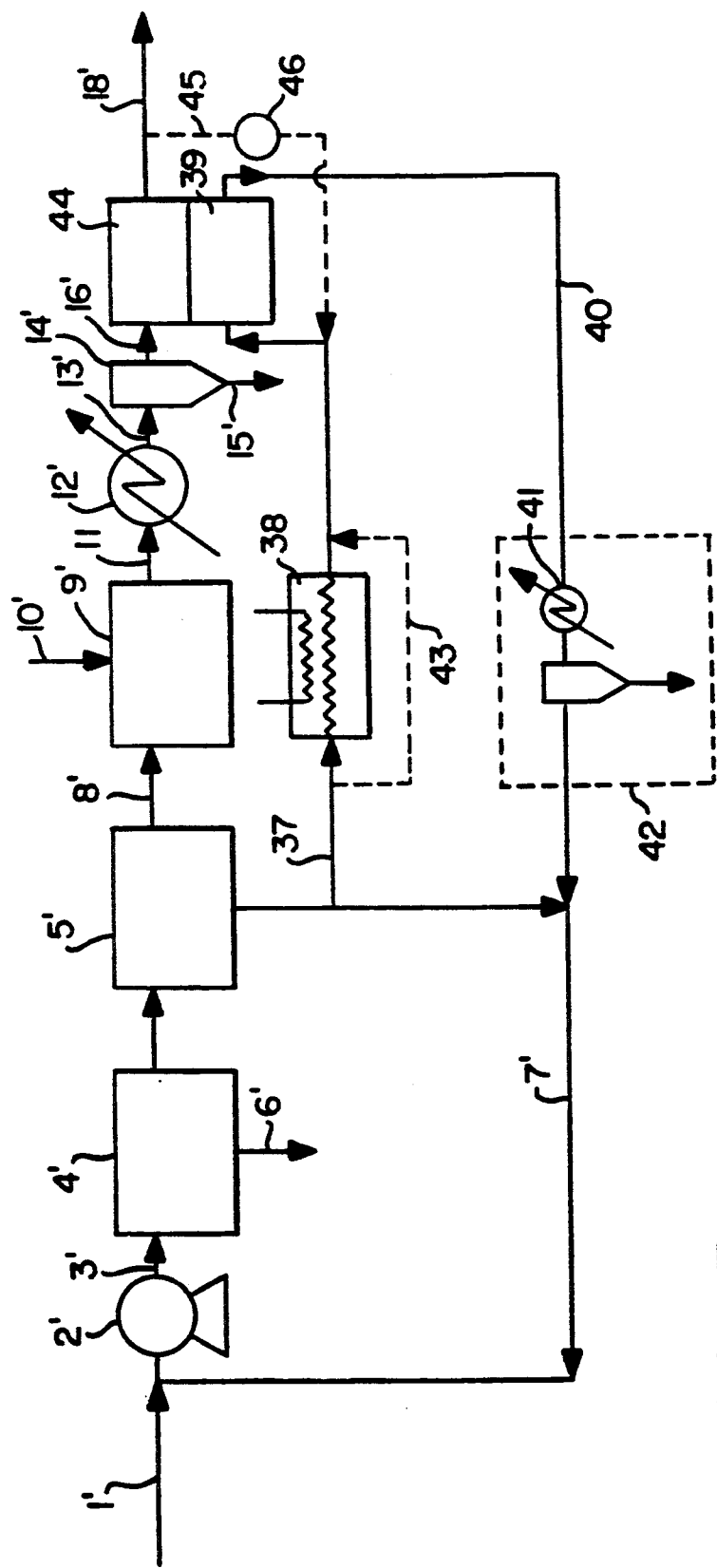
FIG. 3 is a schematic diagram of an alternative embodiment for the production of dry, high purity nitrogen using second stage membrane permeate as a purge for product dryer regeneration.
Figure 4:
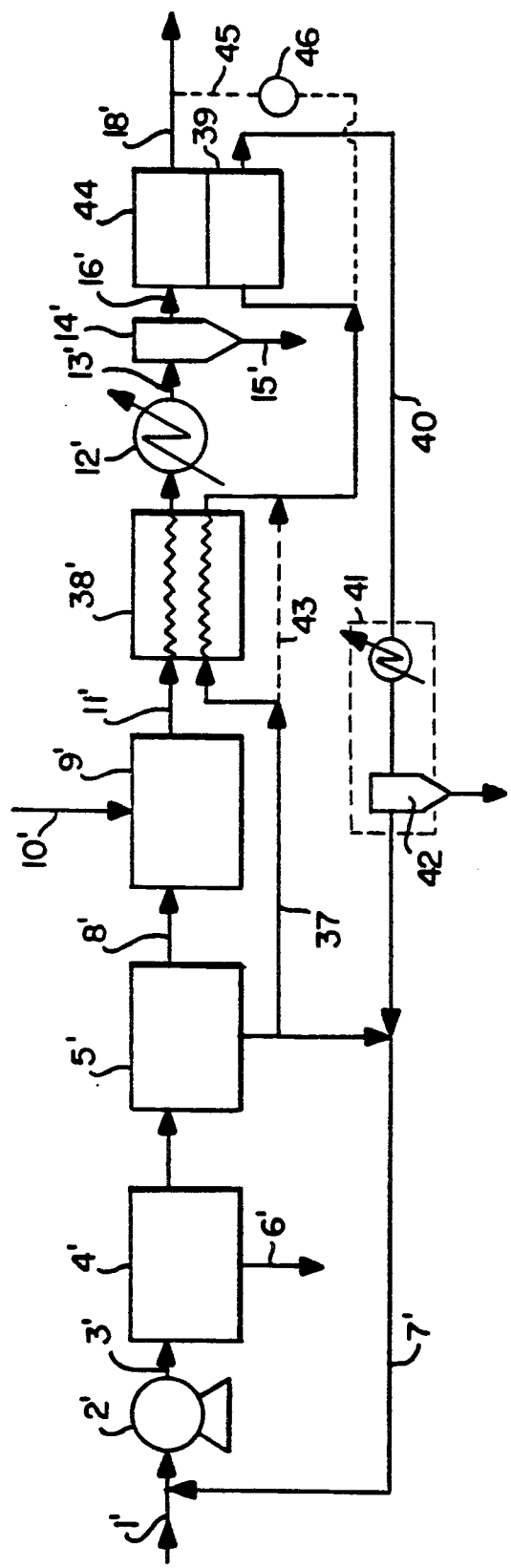
FIG. 4 is a schematic diagram illustrating another embodiment based on the use of second stage membrane permeate as product dryer regeneration purge gas.

In the embodiment shown in FIG. 3, the second stage permeate is passed through a conventional heater, while the FIG. 4 embodiment provides for the second stage permeate to be heated against the nitrogen stream exiting from the deoxo unit. In the FIG. 3 embodiment, as in that of FIG. 1, feed air in line 1' is compressed in compressor 2' and passes in line 3' to first stage membrane 4' and second stage membrane 5'. First stage permeate is discharged through line 6' and a portion of the second stage permeate is recycled through line 7'. Non-permeate passed in line 8' from the membrane system to deoxo unit 9' for reaction of oxygen with hydrogen from line 10'. The treated nitrogen stream leaves said deoxo unit in line 11' and enters cooler 12' from which it passes in line 13' to moisture separator 14', from which moisture is discharged through line 15'. The nitrogen stream then passes in line 16' to the dryer system for final drying.

In the FIG. 3 embodiment, a portion of the permeate from second stage membrane 5' is diverted through line 37 for use as purge gas. Said permeate is heated in external heater 38 and passes to dryer bed 39 undergoing regeneration. The effluent purge gas from said dryer bed is passed in line 40 for recycle with the remaining portion of the permeate being recycled through line 7'. Optionally, the recycle purge effluent in line 40 can pass through cooler 41 and water separator 42 for the removal of water therefrom. If desired, the permeate gas in line 37, or a portion thereof, can by-pass heater 38 by passage through line 43.

The non-permeate nitrogen stream in line 16' is passed to dryer bed 44 which is used for product nitrogen drying, while bed 39 is being regenerated. It will be appreciated that, in the FIG. 3 and other illustrated embodiments, the dryer beds can be alternated in service, so that one bed is used for drying while the other bed is being regenerated. Dry, high purity nitrogen product gas is recovered in line 18'. While none of this product gas need be withdrawn for use as dryer purge gas in the FIG. 3 embodiment, a small amount thereof may, if desired, be recycled through line 45 containing valve 46, for passage to line 37 and dryer bed 39 on regeneration as a bed regeneration rinse gas.

The embodiment illustrated in FIG. 4 will be seen to be the same as in the FIG. 3 embodiment except that the heat generated in deoxo unit 9' is used as a source of heat for the second stage membrane effluent being employed as dryer purge gas. Thus, the permeate gas in line 37 is passed to heat exchanger 38' to which the heated nitrogen stream in line 11' is passed prior to entry into cooler 12'. If desired, a portion of said membrane effluent can by-pass heat exchanger 38' by passage through line 43.

Figure 5:
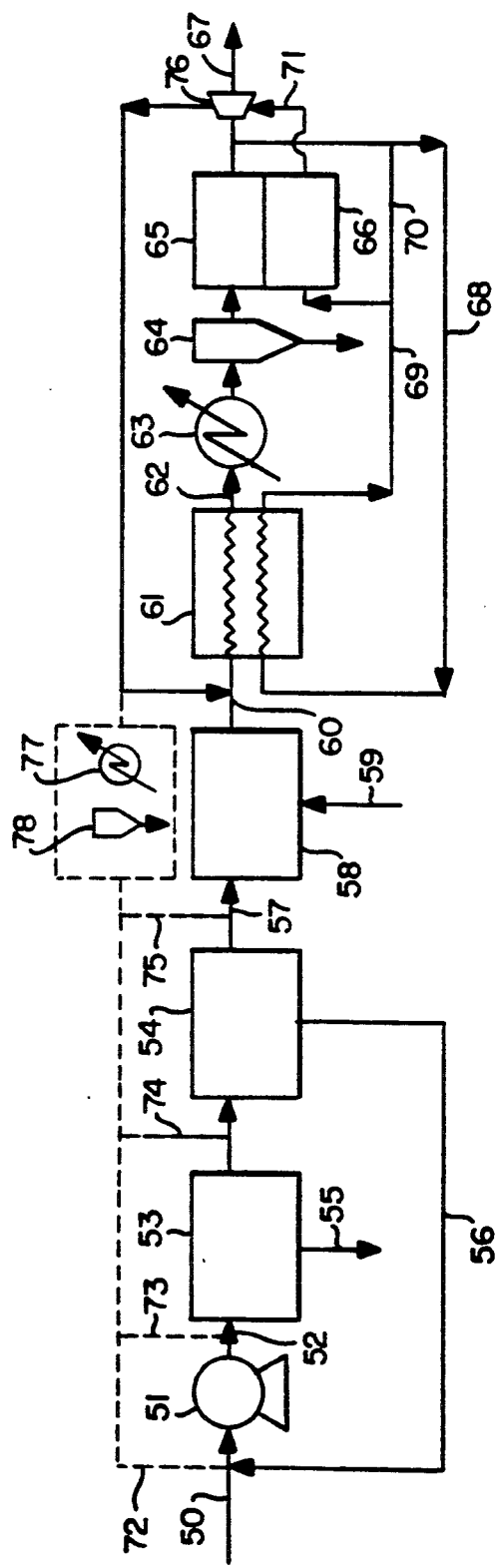
FIG. 5 is a schematic diagram of an embodiment of the invention in which a portion of the product nitrogen gas is used for dryer regeneration purposes.

Those skilled in the art will appreciate that the invention can be carried out using other sources for the dryer purge gas. Thus, a portion of the dry nitrogen product stream can be used for this purpose as shown in FIG. 5 of the drawings. Since desorption can be carried out in the dryer at product pressure, possible blowdown losses are avoided. It will be appreciated that the use of clean purge gas in this embodiment precludes the risk of oxygen entering the product stream at the time of bed switching. On the other hand, this embodiment typically requires the use of about 5 to 7% of the product nitrogen for purge purposes. Since the waste purge is of high purity and is under pressure, it can be advantageously recycled, with a number of possible recycle points being available as noted on the drawing. In the FIG. 5 embodiment, feed air is passed in line 50 to air compressor 51 from which compressed air passes in line 52 to the air separation membrane system comprising first stage membrane unit 53 and second stage membrane 54. Permeate effluent from membrane 53 is discharged through line 55, while second stage permeate is recycled in line 56 for passage to air compressor 51 along with additional feed air in line 50. Non-permeate nitrogen is passed in line 57 to deoxo unit 58, to which hydrogen is added through line 59. The exothermic heat of the deoxo reaction is utilized by passing the nitrogen stream from deoxo unit 58 in line 60 to heat exchanger 61 from which it is passed in line 62 to cooler 63, water separator 64 and dryer bed 65 that is in drying service while dryer bed 66 is being regenerated. Dry, high purity nitrogen product gas is recovered from dryer bed 65 through line 67. In this embodiment, a portion of the product nitrogen is diverted through line 68 for heating in heat exchanger 61 prior to passage in line 69 to dryer bed 66 as high temperature purge gas therefor. For desired temperature control, a portion of the nitrogen product gas being recycled can be passed to line 69 through line 70, thereby by-passing passage through the heat exchanger.

Dryer purge waste gas is removed from bed 66 through line 71. Since this stream contains high purity nitrogen, it is desirably cycled to one of several optional recycle points. Thus, the purge waste gas can be recycled to line 60 for passage into heat exchanger 61 and return to the dryer system for drying. Alternately, it can be recycled to the compressor inlet i.e. at line 50, to the inlet to the membrane system, i.e. at line 52, at an intermediate point between the membrane stages, at the exit of the second membrane stage, i.e. at line 57. Such alternatives are illustrated by lines 72, 73, 74 and 75, respectively, shown as providing for the recycle of gas from line 71 to the various recycle points.

While the wet purge waste gas can be recycled to the compressor inlet without recompression, a small boost in pressure, e.g. 1-2 psi, is sufficient to enable it to be recycled to the other purge recycle points. Due to the small amount of recompression required, and the small amount of recycle flow required relative to total nitrogen product flow, gas booster compressor 76 can be conveniently used to raise the pressure of the purge gas recycle stream at the exit of the deoxo unit 58, i.e. at line 60, before cooler 77 and moisture separator 78 used when said purge gas recycle stream is passed further upstream in the overall cycle. Gas booster compressor is conveniently operated by affecting only a slight expansion and drop in total pressure of the product nitrogen stream in line 67. As the available product pressure is usually determined by membrane process economics, rather than by downstream customer requirements, the slightly lower product pressure is not a drawback in the overall process. It will be appreciated, therefore, that this embodiment enables the adsorptive dryer purge energy and flow requirements to be satisfied with no loss in product recovery, at the modest expense of two simple pieces of equipment, a heat exchanger and a gas booster.

Figure 6:
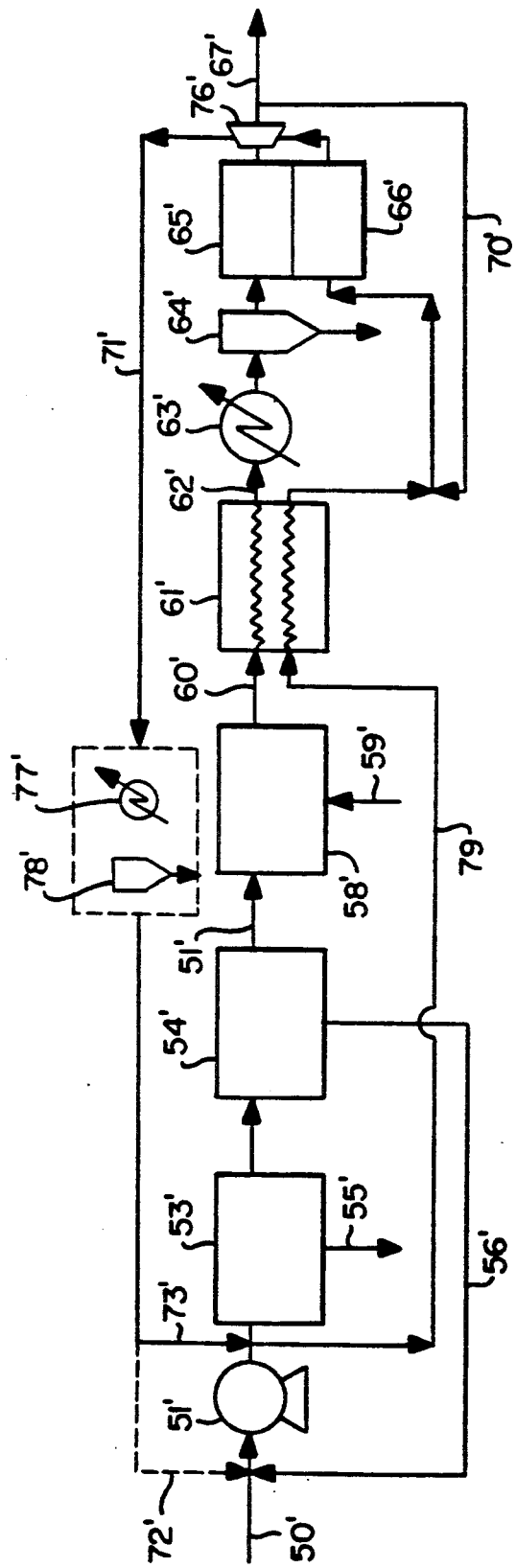
FIG. 6 is a schematic diagram of an embodiment of the invention in which a compressed air purge is employed for high temperature dryer regeneration.

In the embodiment illustrated in FIG. 6, a portion of the compressed air stream is used for adsorbent bed heating purge. Since this stream is under pressure, an isobaric or constant pressure adsorption system can be used and pressure blowdown losses avoided. It will be seen from FIG. 6 that the process and system are similar to that of the FIG. 5 embodiment, except that a portion of the compressed air in line 52' is passed through line 79 to heat exchanger 61, where it is heated by exchange with the nitrogen stream that was heated by the heat of reaction in the deoxo unit. Recycle purge gas in line 71', upon cooling and moisture separation, is returned to the compressed air stream in line 52' or to incoming feed air line 50'. It will be understood that the compressed air thus used for purge purposes contains a significant amount of moisture and oxygen. Thus, as in the permeate purge case, a portion of the dry, high purity nitrogen product is needed for bed cooling and rinsing purposes, said portion estimated to be on the order of 2–4% of the total amount of available dry, high purity nitrogen product.

Figure 7:
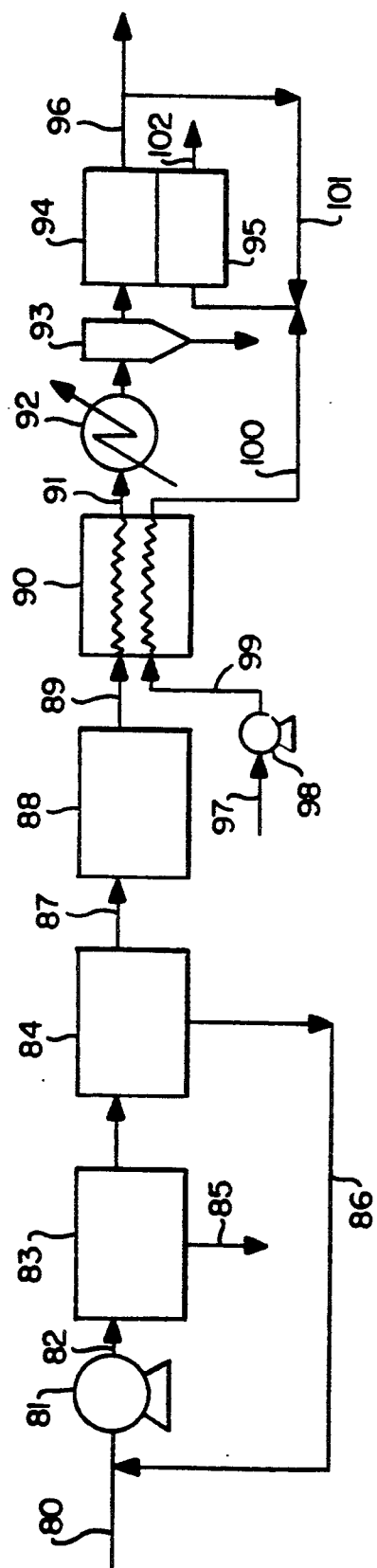
FIG. 7 is a schematic diagram of the invention in which ambient air is employed for high temperature dryer regeneration purge purposes.

In a further embodiment as illustrated in FIG. 7, ambient air can be used as the source of high temperature purge gas for the dryer. In this embodiment, feed air from line 80 is compressed in air compressor 81 and is passed to the air separation membrane system comprising first stage membrane 83 and second stage membrane 84. Permeate gas from membrane 83 is discharged through line 85, while second stage permeate is passed through line 86 for recycle to line 80. Non-permeate nitrogen is passed from the membrane system in line 87 to deoxo unit 88 and therefrom in line 89 to heat exchanger 90. Said nitrogen stream is then passed in line 91, containing cooler 92 and moisture separator 93 to dryer bed 94, which is in adsorptive drying service while dryer bed 95 is being regenerated. Dry, high purity nitrogen product is recovered through line 96. Ambient air is passed from line 97 to blower 98 and therefrom in line 99 to said heat exchanger 90, where it is heated for use in high temperature dryer regeneration by the heat generated in deoxo unit 88. The thus-heated air stream passes in line 100 to dryer bed 95 being regenerated for use therein as high temperature purge gas. As noted above, a portion of the dry, high purity nitrogen product in line 96 is recycled in line 101 for passage to said dryer bed 95 for cooling and rinse purposes. The purge gas effluent stream is removed from dryer bed 95 through line 102. The requirement of a purge blower in this embodiment involves an additional associated capital and power cost. In addition, a portion of the dry, high purity nitrogen product, estimated at about 3–5% of the total thereof, is required for bed cooling and cleaning, and as a result of pressure blowdown losses. Although the waste purge gas in line 102 could be recycled to the air compressor inlet at line 80, the availability, in terms of pressure and purity, of a significant portion of the clean, dry nitrogen product gas would nevertheless have been lost. For these reasons, the latter embodiment of FIG. 7 is a generally less attractive embodiment of the invention than others heretofore described.

The invention will be seen as enhancing the feasibility of using membrane air separation systems in practical commercial operations in which dry, high purity nitrogen product gas is required. For purposes of the invention, a variety of well known membrane systems capable of selectively permeating oxygen from feed air can be used. Any desired type of membrane structure, such as well known composite-type membranes, asymmetric membranes or any other form of membrane configuration can be employed. A composite membrane having a thin ethyl cellulose separation layer on a porous hollow fiber polysulfone substrate is an illustrative example of the many membrane compositions known in the art for air separation purposes. While the invention has been described with respect to the illustrated embodiments particularly with reference to desirable two-stage membrane systems, those skilled in the art will appreciate that the membrane system may also comprise a single membrane stage or, alternatively, can comprise more than two membrane stages.

The catalytic combustion system employed in the practice of the invention, i.e. the deoxo unit, for the deoxygenation of the nitrogen gas recovered as non-permeate gas from the air separation membrane system, comprises well known, established technology. The deoxo unit typically employs a noble metal catalyst, such as platinum or a platinum-palladium catalyst, supported on an alumina substrate. One or more catalytic beds are used, wherein the oxygen content of the partially purified nitrogen stream produced in the air separation membrane system is reacted with hydrogen, or with a fuel gas such as methane.

It will be further appreciated by those skilled in the art that the adsorptive dryer units employed in the practice of the invention comprise beds of commercially available adsorbent material capable of selectively adsorbing moisture from the high purity nitrogen streams produced by the air separation membrane system-deoxo system combination referred to above. The adsorbent material employed in the practice of the invention can be any well known adsorbent material capable of selectively adsorbing moisture from a high purity nitrogen stream. Zeolitic molecular sieves, such as 5A and 13X material, can conveniently be used in the practice of the invention, as can any other commercially available adsorbent material capable of the desired drying of the product nitrogen stream.

In the description above, it is disclosed that a dual bed dryer system can commercially be employed, with one bed being used in nitrogen drying service while the other bed is being regenerated. It will be appreciated that dryer systems employing another desirable number of bed(s) can also be employed. In carrying out the desired nitrogen drying operation, it will be appreciated that the invention utilizes a high temperature purge stream to facilitate removal of adsorbed moisture from the adsorbent bed(s) being regenerated after a period of use in the drying of nitrogen product. Such operation is generally known as a thermal swing adsorption (TSA) process and system in which an increase in bed temperature, by the use of dry, high temperature purge gas, facilitates the removal of moisture adsorbed on the adsorbent material at a lower adsorption temperature. Such TSA operations are generally carried out as noted above under constant pressure conditions, thereby avoiding blowdown pressure losses. It will be understood that the drying operations of the invention can, if desired, also comprise a pressure swing adsorption (PSA) operation, if desired, as by the carrying out of the adsorption of moisture at an upper adsorption pressure, and the desorption of said moisture and its removal from the adsorptive bed at a lower desorption pressure.

In the practice of the invention, compressed air is fed to the air separation membrane system generally at a pressure of about 50 to 300 psig, typically at about 150 psig, and a temperature on the order of about 90° F. As will be noted from the illustrative embodiments above, the permeate gas from the second stage of a two stage membrane system is commonly recycled to the inlet to the system, if not otherwise used as provided herein, since the oxygen content thereof may be less than that of air. Also as noted above, the exothermic nature of the deoxo reaction releases a substantial quantity of heat, which raises the nitrogen stream temperature about 300° F. per each 1% of oxygen removed. In the conventional prior art approach referred to in the background description above, this heat is rejected by an aftercooler, with condensate being removed by a moisture separator, while such heat is advantageously employed in the practice of the invention in various embodiments herein described and claimed. A variety of dryers are commercially available to produce dry nitrogen product, such as −40° F. PDP, or very dry, e.g. −100° F. PDP, gas streams. The pressure swing adsorption (PSA) type of dryer needs no heat for bed regeneration, but does require a high purge flow, typically on the order of 15% of the inlet flow. A thermal swing adsorption (TSA) type of dryer requires less than half of this purge gas flow (depending on the purge temperature and humidity conditions), but, in conventional practice, requires an external heat source, such as electricity or natural gas. Ambient air may be used for heating at the expense of a significant increase in thermal energy requirements. In such applications, a portion of the dry nitrogen product gas would still be required for bed cooling purposes, and to prevent oxygen from entering the product stream during bed switching.

The adsorptive energy requirements using a dry product purge have been determined to be on the order of about $8 \times 10^{-5}$ KW for SCFH of product nitrogen, with a desirable capitalized thermal energy savings being achieved by the use of heat generated in the deoxo unit to supply such thermal energy requirements. Those skilled in the art will appreciate that the practice of the invention to effectively utilize such deoxo heat, or to use high purge/feed ratios to reduce the thermal energy requirements of high temperature regeneration, provides a significant commercial benefit in the production of dry, high purity nitrogen product gas. Moreover, this benefit is particularly applicable for large scale nitrogen production operations, where the operating savings more than offset the cost of an additional heat exchanger and associated piping as employed in various embodiments of the invention. The invention is of particular advantage in that such highly desirable thermal energy savings can be accomplished without any appreciable decrease in the recovery of valuable high purity nitrogen product.

We claim:

1. An improved process for the production of dry, high purity nitrogen comprising:
    (a) passing feed air to a membrane system for separation therein and recovering a partially purified nitrogen stream containing residual oxygen;
    (b) reacting the residual oxygen present in said nitrogen stream with hydrogen in a catalytic combustion system, the exothermic nature of the reaction between said hydrogen and oxygen generating a heat of reaction, with a wet, high purity nitrogen stream being recovered from said system;
    (c) drying said wet, high purity nitrogen stream in an adsorptive dryer bed at a drying temperature lower than the temperature in the catalytic combustion system; and
    (d) regenerating said adsorptive dryer bed for the removal of moisture therefrom by passing purge gas therethrough at an elevated dryer regeneration temperature higher than said drying temperature, said purge gas having been heated to the desired regeneration temperature utilizing the heat of reaction generated in said catalytic combustion system and comprising the wet, high purity nitrogen stream recovered from the catalytic combustion system, said nitrogen stream being passed directly to the adsorptive dryer bed being regenerated at elevated temperature, without cooling to the lower drying temperature and associated moisture removal, and including passing said high purity nitrogen stream from said dryer bed being regenerated to a dryer bed being used in drying service for the drying of said wet, high purity nitrogen stream at the lower drying temperature, whereby the benefits of high temperature adsorptive dryer regeneration can be efficiently achieved by the utilization of the thermal energy generated in the catalytic combustion system for the heating of the purge gas used for dryer regeneration.

2. The process of claim 1 and including passing the high purity nitrogen stream used as purge gas for adsorptive dryer bed regeneration to cooler and moisture separator means before being passed to an adsorptive dryer bed for the drying thereof.

3. An improved process for the production of dry, high purity nitrogen comprising:
    (a) passing feed air to a membrane system for separation therein and recovering a partially purified nitrogen stream containing residual oxygen, said membrane system comprising more than one membrane stage, with a partially purified nitrogen stream being removed therefrom as non-permeate gas, and including removing, other than from the first stage, a permeate gas at a nitrogen concentration high relative to the first stage, a portion of said permeate gas being used as said dryer purge gas passed to the heat exchanger;
    (b) reacting the residual oxygen present in said nitrogen stream with hydrogen in a catalytic combustion system, the exothermic nature of the reaction between said hydrogen and oxygen generating a heat of reaction, with a wet, high purity nitrogen stream being recovered from said system;
    (c) passing said wt, high purity nitrogen stream to a heat exchanger for the removal of heat of reaction therefrom prior to drying;
    (d) drying said wet, high purity nitrogen stream in an adsorptive dryer bed at a drying temperature lower than the temperature in the catalytic combustion system; and
    (e) regenerating said adsorptive dryer bed for the removal of moisture therefrom by passing purge gas therethrough at an elevated drying regeneration temperature higher than said drying temperature, said purge gas having been passed through said heat exchanger for heating to the desired regeneration temperature utilizing the heat of reaction generated in said catalytic combustion system, prior to passage to the dryer bed at said elevated dryer regeneration temperature, whereby the benefits of high temperature adsorptive drying regeneration can be efficiently achieved by the utilization of the thermal energy generated in the catalytic combustion system for the heating of the purge gas used for drying regeneration.

4. The process of claim 3 in which said permeable gas used as dryer purge comprises a portion of second stage permeate gas, the membrane system comprising a two stage system.

5. The process of claim 4 and including recycling the purge effluent from the dryer bed being regenerated for compression and passage to the membrane system.

6. An improved process for the production of dry, high purity nitrogen comprising:
   (a) passing feed air to a membrane system for separation therein and recovering a partially purified nitrogen stream containing residual oxygen;
   (b) reacting the residual oxygen present in said nitrogen stream with hydrogen in a catalytic combustion system, the exothermic nature of the reaction between said hydrogen and oxygen generating a heat of reaction, with a wet, high purity nitrogen stream being recovered from wet system;
   (c) passing said wet, high purity nitrogen stream to a heat exchanger for the removal of heat of reaction therefrom prior to drying in an adsorptive dryer bed;
   (d) passing compressed air to said heat exchanger for heating prior to use as purge gas for said adsorptive dryer bed regeneration;
   (e) drying said wet, high purity nitrogen stream in said adsorptive dryer bed at a drying temperature lower than the temperature in the catalytic combustion system; and
   (f) regenerating said adsorptive dryer bed for the removal of moisture therefrom by passing purge gas therethrough at an elevated drying regeneration temperature higher than said drying temperature, said purge gas having been passed through said heat exchanger for heating to the desired regeneration temperature utilizing the heat of reaction generated in said catalytic combustion system, whereby the benefits of high temperature adsorptive drying regeneration can be efficiently achieved by the utilization of the thermal energy generated in the catalytic combustion system for the heating of the purge gas used for drying regeneration.

7. The process of claim 6 and including recycling the purge effluent from the dryer bed being regenerated for passage with additional quantities of feed air to the membrane system for recovery of additional quantities of nitrogen therefrom.

8. The process of claim 6 in which said compressed air comprises compressed feed air.

9. The process of claim 6 in which said compressed air comprises compressed ambient air.

10. An improved process for the production of dry, high purity nitrogen comprising:
    (a) passing feed air to a membrane system for separation therein and recovering a partially purified nitrogen stream containing residual oxygen, said membrane system comprising more than one membrane stage;
    (b) reacting the residual oxygen present in said nitrogen stream with hydrogen in a catalytic combustion system, the exothermic nature of the reaction between said hydrogen and oxygen generating a heat of reaction, with a wt, high purity nitrogen stream being recovered as non-permeate gas from the system;
    (c) cooling said nitrogen stream to a drying temperature lower than the temperature in the catalytic combustion system and removing moisture therefrom;
    (d) drying said wet, high purity nitrogen stream in an adsorptive dryer bed at the lower drying temperature level;
    (e) removing, other than from the first membrane stage, a permeate gas at a nitrogen concentration large relative to the first stage;
    (f) passing a portion of said permeate gas through heat exchange means for heating to a dryer regeneration temperature higher than the drying temperature, said portion of permeate gas to be used as dryer purge gas thereby reducing the thermal energy requirements of the dryer; and
    (g) passing the thus-heated permeate gas to the dryer bed at said dryer regeneration temperature for regeneration of said dryer bed, whereby the benefits of high temperature adsorptive dryer regeneration can be effectively achieved at reduced thermal energy requirements.

11. The process of claim 10 in which said membrane system is a two-stage system.

12. The process of claim 10 and including recycling the purge effluent from the dryer for passage, with additional quantities of feed air, to the membrane system for recovery of additional quantities of nitrogen therefrom.

13. An improved process for the production of dry, high purity nitrogen comprising: (a) passing feed air to a membrane system for separation therein and recovering a partially purified nitrogen stream containing residual oxygen;
    (b) reacting the residual oxygen present in said nitrogen stream with hydrogen in a catalytic combustion system, the exothermic nature of the reaction between said hydrogen and oxygen generating a heat of reaction, with a wet, high purity nitrogen stream being recovered from said system;
    (c) passing said wet, high purity nitrogen stream to a heat exchanger for the removal of heat of reaction therefrom prior to drying in an adsorptive dryer bed;
    (d) drying said wet, high purity nitrogen stream in said adsorptive dryer bed at a drying temperature lower than the temperature in the catalytic combustion system; and
    (e) regenerating said adsorptive dryer bed for the removal of moisture therefrom by passing purge gas therethrough at an elevated drying regeneration temperature higher than said drying temperature, said purge gas having been passed through said heat exchanger for heating in said heat exchanger to the desired regeneration temperature utilizing the heat of reaction generated in said catalytic combustion system, said purge gas comprising a portion of the dry, high purity nitrogen stream dried in said adsorptive dryer bed recycled for use as said purge gas, whereby the benefits of high temperature adsorptive drying regeneration can be efficiently achieved by the utilization of the thermal energy generated in the catalytic combustion system for the heating of the purge gas used for dryer regeneration.

14. An improved system for the production of dry, high purity nitrogen comprising:
    (a) a membrane system for the separation of feed air and the recovery of a partially purified nitrogen stream containing residual oxygen, said membrane system comprising more than one membrane stage, with conduit means for removing a partially purified nitrogen stream as non-permeate gas, and conduit means for removing, other than from the first stage, a permeate gas at a nitrogen concentration high relative to the first stage;

(b) a catalytic combustion system adapted for the reaction of residual oxygen present in said partially purified nitrogen stream with hydrogen, and the generation of a heat reaction, and the recovery of a wet, high purity nitrogen stream;

(c) heat exchanger means adapted for the transfer of heat from said wet, high purity nitrogen stream to a purge gas stream to be used for the regeneration of a bed of adsorptive material used to dry said wet, high purity nitrogen stream;

(d) conduit means for passing a portion of said permeate gas to be used as purge gas to said heat exchanger means;

(e) an adsorptive dryer system adapted for the drying of said wet, high purity nitrogen by adsorption of moisture therefrom on an adsorptive dryer bed at a drying temperature lower than the temperature in the catalytic combustion system, said drying system containing at least two beds, with one bed being available for drying said nitrogen stream while another bed is being regenerated by the removal of adsorbed moisture therefrom at an elevated bed regeneration temperature higher than said drying temperature; and (f) conduit means for passing said purge gas from the heat exchanger means to the bed of said adsorptive dryer system being regenerating at said elevated bed regeneration temperature, whereby the benefits of high temperature adsorptive dryer regeneration can be effectively achieved by the utilization of the thermal energy generated in the catalytic combustion system for the heating of the purge gas used for drying regeneration.

15. The system of claim 14 in which said membrane system contains two membrane stages.

16. An improved system for the production of dry, high purity nitrogen comprising:

(a) a membrane system for the separation of feed air and the recovery of a partially purified nitrogen stream containing residual oxygen;

(b) a catalytic combustion system adapted for the reaction of residual oxygen present in said partially purified nitrogen stream with hydrogen, and the generation of a heat of reaction, and the recovery of a wt, high purity nitrogen stream;

(c) heat exchanger means adapted for the transfer of heat from said wet, high purity nitrogen stream to a purge gas stream to be used for the regeneration of a bed of adsorptive material used to dry said wet, high purity nitrogen stream;

(d) an adsorptive dryer system adapted for the drying of said wet, high purity nitrogen by adsorption of moisture therefrom on an adsorptive dryer bed at a drying temperature lower than the temperature in the catalytic combustion system, said drying system containing at least two beds, with one bed being available for drying said nitrogen stream while another bed is being regenerated by the removal of adsorbed moisture therefrom at an elevated bed regeneration temperature higher than said drying temperature; and (e) conduit means for passing said purge gas from the heat exchanger means to the bed of said adsorptive dryer system being regenerating at said elevated bed regeneration temperature; and (f) conduit means for recycling a portion of dry, high purity nitrogen product from said adsorption dryer system to said heat exchanger means as said purge gas stream.

17. An improved system for the production of dry, high purity nitrogen comprising:

(a) a membrane system for the separation of feed air and the recovery of a partially purified nitrogen stream containing residual oxygen;

(b) a catalytic combustion system adapted for the reaction of residual oxygen present in said partially purified nitrogen stream with hydrogen, and the generation of a heat of reaction, and the recovery of a wt, high purity nitrogen stream;

(c) heat exchanger means adapted for the transfer of heat from said wet, high purity nitrogen stream to a purge gas stream to be used for the regeneration of a bed of adsorptive material used to dry said wet, high purity nitrogen stream;

(d) an adsorptive dryer system adapted for the drying of said wet, high purity nitrogen by adsorption of moisture therefrom on an adsorptive dryer bed at a drying temperature lower than the temperature in the catalytic combustion system, said drying system containing at least two beds, with one bed being available for drying said nitrogen stream while another bed is being regenerated by the removal of adsorbed moisture therefrom at an elevated bed regeneration temperature higher than said drying temperature; and (e) conduit means for passing said purge gas from the heat exchanger means to the bed of said adsorptive dryer system being regenerating at said elevated bed regeneration temperature; and (f) conduit means for passing air to said heat exchanger means as said purge gas stream, whereby the benefits of high temperature adsorptive dryer regeneration can be effectively achieved by the utilization of the thermal energy generated in the catalytic combustion system for the heating of the purge gas used for drying regeneration.

18. The system of claim 17 in which said conduit means for passing air to the heat exchanger means comprises conduit means for passing a portion of the feed air being passed o the membrane system at the desired membrane pressure to said heat exchanger means.

19. An improved system for the production of dry, high purity nitrogen comprising:

(a) a membrane system for the separation of feed air and the recovery of a partially purified nitrogen stream containing residual oxygen;

(b) a catalytic combustion system adapted for the reaction of residual oxygen present in said partially purified nitrogen stream with hydrogen, and the generation of a heat of reaction, and the recovery of a wet, high purity nitrogen stream;

(c) an adsorptive dryer system adapted for the drying of said wet, high purity nitrogen by adsorption of moisture therefrom on an adsorptive dryer bed at a drying temperature lower than the temperature in the catalytic combustion system, said dryer system containing at least two beds, with one bed being available for drying said nitrogen stream while another bed is being regenerated by the removal of adsorbed moisture therefrom at a bed regeneration temperature higher than the drying temperature;

(d) conduit means containing valve control means for passing said nitrogen stream from the catalytic combustion system to a bed in said dryer system undergoing regeneration, without passage through cooling means for cooling said nitrogen stream to said drying temperature level;

(e) conduit means, including cooling and moisture removal means, for the passage of said wet, high purity nitrogen stream to a bed in said dryer system for drying said nitrogen stream at the drying temperature; and (f) conduit means for removing dry, high purity nitrogen product from the adsorptive dryer system, whereby the benefits of high temperature adsorptive dryer regeneration can be effectively achieved by the utilization of the thermal energy generated in the catalytic combustion system, as contained in the wet, high purity nitrogen stream removed therefrom as purge gas for the dryer system, said thermal energy utilization being achieved without any significant decrease in nitrogen product recovery.

20. The system of claim 19 in which said membrane system contains more than one stage, the nitrogen stream recovered therefrom being obtained as a non-permeate stream, and including means for recycling permeate gas, other than from the first stage, for passage with additional quantities of feed air, to the membrane system.

21. The system of claim 20 in which said membrane system is a two-stage system.

22. An improved system for the production of dry, high purity nitrogen comprising:

(a) a membrane system containing more than one membrane stage for the separation of feed air and the recovery of a partially purified nitrogen stream containing residual oxygen;

(b) a catalytic combustion system adapted for the reaction of residual oxygen present in said partially purified nitrogen stream with hydrogen, and the generation of a heat of reaction, and the recovery of a wet, high purity nitrogen stream;

(c) an adsorptive dryer system adapted for the drying of said wet, high purity nitrogen by adsorption of moisture therefrom on an adsorptive dryer bed at a drying temperature lower than the temperature in the catalytic combustion system, said dryer system containing at least two beds, with one bed being available for drying said nitrogen stream while another bed is being regenerated by the removal of adsorbed moisture therefrom at an elevated bed regeneration temperature higher than said drying temperature;

(d) heat exchange means adapted for the transfer of heat from said wet, high purity nitrogen stream to a purge stream to be used for the regeneration of a bed of adsorptive material used to dry said wet, high purity nitrogen stream; and (e) conduit means for removing, other than from the first membrane stage, a gas stream available at a nitrogen concentration high relative to the first stage, and including conduit means for passing a portion of said gas stream to said heat exchanger means to provide a relatively large purge/feed ratio in the adsorptive dryer system; whereby the benefits of high temperature adsorptive dryer regeneration can be effectively achieved at reduce thermal energy requirements.

23. The system of claim 22 in which said membrane system comprises a two-stage system.

24. The system of claim 22 and including conduit means for recycling effluent gas from the adsorptive dryer system for passage, with additional quantities of feed air, to said membrane system.

* * * * *